(12) United States Patent
Mäsak (10) Patent No.: US 11,434,992 B2
(45) Date of Patent: Sep. 6, 2022

(54) GEAR SHIFT ARRANGEMENT FOR A TRANSMISSION OF A VEHICLE

(71) Applicant: VOLVO TRUCK CORPORATION, Gothenburg (SE)

(72) Inventor: Magnus Mäsak, Henån (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 614 days.

(21) Appl. No.: 16/462,305

(22) PCT Filed: Dec. 23, 2016

(86) PCT No.: PCT/EP2016/082595
§ 371 (c)(1),
(2) Date: May 20, 2019

(87) PCT Pub. No.: WO2018/114002
PCT Pub. Date: Jun. 28, 2018

(65) Prior Publication Data
US 2019/0368605 A1 Dec. 5, 2019

(51) Int. Cl.
*F16H 61/28* (2006.01)
*F16H 63/20* (2006.01)
(Continued)

(52) U.S. Cl.
CPC ........... *F16H 61/28* (2013.01); *F16H 63/206* (2013.01); *F16H 63/28* (2013.01); *F16H 63/34* (2013.01);
(Continued)

(58) Field of Classification Search
CPC ............... F16H 2063/321; F16H 61/28; F16H 63/206; F16H 63/28; F16H 63/34; F16H 2063/3079
See application file for complete search history.

(56) References Cited

U.S. PATENT DOCUMENTS

| 1,283,561 | A | * | 11/1918 | Richardson | F16H 63/28 74/334 |
| 3,015,968 | A | * | 1/1962 | Szekely | F16H 63/36 74/41 |
| 3,370,477 | A | * | 2/1968 | Lewis | F16H 63/18 74/337.5 |
| 4,895,469 | A | * | 1/1990 | Coueron | F16B 39/28 411/324 |

(Continued)

FOREIGN PATENT DOCUMENTS

| DE | 19920064 A1 | 11/2000 |
| DE | 102008000072 A1 | 7/2009 |

(Continued)

OTHER PUBLICATIONS

International Search Report and Written Opinion dated Aug. 29, 2017 in International Application No. PCT/EP2016/082595.

*Primary Examiner* — Terence Boes
(74) *Attorney, Agent, or Firm* — Venable LLP; Jeffri A. Kaminski (57) ABSTRACT

The present invention relates to a gear shift arrangement (100) for a transmission arrangement of a vehicle, the gear shift arrangement comprising an axially movable first connecting mechanism (102) connectable to a first gear wheel for engagement of a first gear of the transmission arrangement; an axially movable second connecting mechanism (104) connectable to a second gear wheel for engagement of a second gear of the transmission arrangement; an actuator arrangement (106) configured to controllably connect the first connecting mechanism (102) and the first gear wheel to each other, and to controllably connect the second connecting mechanism (104) and the second gear wheel to each other, wherein the first connecting mechanism (102) comprises a first connector element (108), the second connecting mechanism (104) comprises a second connector element (Continued)

(110) and the actuator arrangement (106) comprises an actuator connector element (112), wherein the second connector element (110) at least partially enclosing the actuator connector element (112), and the actuator connector element (112) at least partially enclosing the first connector element (108), wherein the gear shift arrangement (100) further comprises means (114) for selectively connecting the actuator connector element (112) to the first (108) and second (110) connector elements.

12 Claims, 5 Drawing Sheets

(51) Int. Cl.
  *F16H 63/28* (2006.01)
  *F16H 63/34* (2006.01)
  *F16H 63/30* (2006.01)
  *F16H 63/32* (2006.01)

(52) U.S. Cl.
  CPC ............... *F16H 2063/3079* (2013.01); *F16H 2063/321* (2013.01)

(56) References Cited

U.S. PATENT DOCUMENTS

| | | | | |
|---|---|---|---|---|
| 5,481,935 | A * | 1/1996 | Bailly | F16H 63/36 |
| | | | | 74/473.1 |
| 5,740,695 | A * | 4/1998 | Janson | F16H 63/32 |
| | | | | 74/337.5 |
| 5,743,147 | A * | 4/1998 | Gazyakan | F16H 63/22 |
| | | | | 74/473.1 |
| 2013/0199885 | A1* | 8/2013 | Quehenberger | F16D 27/10 |
| | | | | 192/85.01 |
| 2015/0176707 | A1* | 6/2015 | Remmler | F16H 63/3069 |
| | | | | 74/337.5 |
| 2016/0091037 | A1* | 3/2016 | Iwata | F16D 63/006 |
| | | | | 188/152 |
| 2018/0135751 | A1* | 5/2018 | Maki | F16D 23/12 |
| 2019/0085976 | A1* | 3/2019 | Gassmann | F16H 63/304 |
| 2020/0370646 | A1* | 11/2020 | Trinh | F16H 63/24 |
| 2021/0317912 | A1* | 10/2021 | Schaller | F16H 61/30 |

FOREIGN PATENT DOCUMENTS

| | | |
|---|---|---|
| EP | 2232107 B1 | 9/2010 |
| EP | 2722565 A1 | 4/2014 |
| FR | 2909431 A1 | 6/2008 |
| JP | S6120945 U | 2/1986 |

* cited by examiner

GEAR SHIFT ARRANGEMENT FOR A TRANSMISSION OF A VEHICLE

TECHNICAL FIELD

The present invention relates to a gear shift arrangement. In particular, the invention relates to a gear shift arrangement for a transmission arrangement of a vehicle. The invention also relates to a transmission arrangement comprising such gear shift arrangement and a method for controlling gear shift in a transmission arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines or buses, etc.

BACKGROUND

In connection to low-, medium and heavy duty vehicles, also commonly referred to as trucks, a transmission arrangement is connected to a prime mover for controlling torque loads from the prime mover to the propelled wheels of the truck. Hereby, a variety of ratios between the input shaft and the output shaft of the transmission arrangement can be obtained.

When shifting between gear stages, i.e. when engaging a gear, a shift fork is often used for engaging a gear such that torque can be transmitted from a transmission shaft to a gear wheel, which gear wheel is arranged in meshed connection with a gear wheel of another transmission shaft. Hereby, the torque can be transmitted from a first transmission shaft to a second transmission shaft. The torque can thereafter be further transmitted to an output shaft of the transmission arrangement via e.g. a further gear teeth engagement.

A problem with the above described transmission arrangement is that each gear wheel which has some sort of bearing to a transmission shaft needs a separate and individually controlled shift fork. This is associated with a relatively high cost for the transmission arrangement and takes up quite a substantial amount of space within the gearbox housing.

There is thus a desire to provide a gear shift arrangement which is cheaper and requires less space within the gearbox housing.

SUMMARY

It is an object of the present invention to provide a gear shift arrangement which at least partially overcomes the above described deficiencies. This is achieved by a gear shift arrangement according to claim 1.

According to a first aspect of the present invention, there is provided a gear shift arrangement for a transmission arrangement of a vehicle, the gear shift arrangement comprising an axially movable first connecting mechanism connectable to a first gear wheel for engagement of a first gear of the transmission arrangement; an axially movable second connecting mechanism connectable to a second gear wheel for engagement of a second gear of the transmission arrangement; an actuator arrangement configured to controllably connect the first connecting mechanism and the first gear wheel to each other, and to controllably connect the second connecting mechanism and the second gear wheel to each other, wherein the first connecting mechanism comprises a first connector element, the second connecting mechanism comprises a second connector element and the actuator arrangement comprises an actuator connector element, wherein the second connector element at least partially enclosing the actuator connector element, and the actuator connector element at least partially enclosing the first connector element, wherein the gear shift arrangement further comprises means for selectively connecting the actuator connector element to the first and second connector elements.

The wording "enclosing" should in the following and throughout the entire description be interpreted as at least partially covering a part circumferentially. Hereby, one connector element is adapted to be axially movable within another connector element. As will be described below, enclosing the first connector element by means of the actuator connector element may be achieved by designing the actuator connector element as an axially extending tube. The second connector element may also be designed as an axially extending tube for at least partially enclosing the actuator connector element. A tube should not be construed as limited to a cross-section having a specific shape. The tube may for example have a cross-section in the form of a circle, rectangle, triangle, etc.

Moreover, the connecting mechanisms may preferably comprise shift forks. The shift forks are arranged to be connected to a respective gear wheel via an engaging sleeve. Hereby, when e.g. the first connecting mechanism is connected to the first gear wheel, the engaging sleeve is preferably provided with inwardly facing gear teeth which are arranged in meshed connection with outwardly facing gear teeth of the first gear wheel. The first connecting mechanism, and in particularly the shift fork of the first connecting mechanism, is in turn slidably connected to an outwardly facing circumferential surface of the engaging sleeve. The inwardly facing gear teeth of the engaging sleeve are further arranged in meshed connection with outwardly facing gear teeth of a transmission shaft. Hereby, the first gear wheel, which is preferably provided with a bearing arrangement towards the transmission shaft, is connected to the transmission shaft. The first gear wheel then rotates with the same rotational speed as the transmission shaft. Accordingly, the connecting mechanism moves the engaging sleeve to engage the gear wheel to the transmission shaft. The wording "connecting mechanism" should thus not be construed as a device which is in direct mechanical connection with a gear wheel, but rather preferably via an intermediate device such as an engaging sleeve.

An advantage of the present invention is that one actuator arrangement can be used for controlling two separately arranged connecting mechanisms, i.e. two different shift forks. Hereby, the transmission arrangement can be provided with a less number of components. As a consequence, the actuator arrangement will require less space within a gearbox housing of the transmission arrangement. The gear shift arrangement is particularly suitable for connection to gear wheels which most often are not engaged sequentially, i.e. the first gear wheel should preferably not be connected directly after the second gear wheel has been disconnected, and vice versa.

According to an example embodiment, the second connector element and the actuator connector element may be tube shaped and have an extension in an axial direction of the transmission arrangement.

As described above, the tube should not be construed as limited to a cross-section having a specific shape. The tube may for example have a cross-section in the form of a circle, rectangle, triangle, etc. By arranging the second connector element and the actuator connector element in a tube shaped form allows for an axial movement of one tube in relation to another. Accordingly, according to an example embodiment, the actuator connector element may be axially movable within the tube of the second connector element.

According to an example embodiment, the first connector element may be axially movable within the tube of the actuator connector element. The first connector element can hereby also be movable within a tube. The first connector element thus has a cross-section which is smaller than the cross-section defined by the tube of the actuator connector element. The first connector element can be designed as a solid shaft or a hollow tube.

According to an example embodiment, the first connector element may comprise a hole, the second connector element may comprise a through hole, and the actuator connector element may comprise a first and a second through hole, wherein the actuator connector element is axially movable between a first position where the first through hole of the actuator connector element is substantially aligned with the hole of the first connector element, and a second position where the second through hole of the actuator connector element is substantially aligned with the through hole of the second connector element.

Hereby, well defined positions for the connector elements are provided. These positions may hereby enable for the connection between the actuator connector element and the first or second connector elements. The wording "substantially aligned" should be understood as an alignment between two parts which is sufficient to e.g. provide the below described additional connector elements there between, i.e. through the first through hole of the actuator connector element and into the hole of the first connector element, or through the second through hole of the actuator connector element and the through hole of the second connector element. Hence, a play in the axial direction is allowable and within the scope of the wording of the present disclosure.

According to an example embodiment, the means for selectively connecting the actuator connector element to the first and second connector elements may be an additional actuator arrangement.

Hereby, a separately controlled additional actuator arrangement is provided, thus reducing the need of two three-way actuators and instead only the need of one.

According to an example embodiment, the additional actuator arrangement may comprise a first and a second additional connector element, the first additional connector element being arranged to connect the actuator connector element to the first connector element, and said second additional connector element being arranged to connect the actuator connector element to the second connector element.

According to an example embodiment, the first and second additional connector elements may be movable in a direction substantially perpendicular to the axial direction of the transmission arrangement.

According to an example embodiment, the first and second additional connector elements may be movable in a direction substantially parallel to the axial direction of the transmission arrangement.

Hereby, when the first or second additional connector elements are engaged, i.e. when connecting the actuator connector element to the first or second connector element, an axial displacement of the additional connector elements is allowed which is beneficial for the actuator arrangement when axially moving the first and/or second connector elements. The additional connector elements may be spring-loaded in the axial direction to return to a starting position once the respective additional connector element has been disengaged.

According to an example embodiment, the additional actuator arrangement may comprise a pivotable lever arm, wherein the first and second additional connector elements are positioned on a respective side of a pivotal joint of the pivotable lever arm.

Hereby, as the first and second additional connector elements should not be engaged at the same time, a simplified arrangement for controlling the motion of the additional connector elements is provided.

According to an example embodiment, the additional actuator arrangement may comprise an actuator for moving the first and second additional connector elements in the direction substantially perpendicular to the axial direction of the transmission arrangement.

The actuator of the additional actuator arrangement may be connected to a control unit for receiving a signal indicative of when to move the first and second additional connector elements to its connected position.

According to an example embodiment, the actuator of the additional actuator arrangement may be one of a pneumatically, a hydraulically or an electrically controlled actuator.

According to a second aspect, there is provided a transmission arrangement for a vehicle, the transmission arrangement comprising a first gear wheel engaged for obtaining a first gear, and a second gear wheel engaged for obtaining a second gear, wherein the transmission arrangement further comprises a gear shift arrangement according to any of the above described example embodiments of the first aspect for engaging the first and second gears.

Effects and features of the second aspect are largely analogous to those described above in relation to the first aspect.

According to a third aspect, there is provided a method for controlling gear shift in a transmission arrangement, the transmission arrangement comprising a gear shift arrangement comprising an axially movable first connecting mechanism comprising a first connector element, an axially movable second connecting mechanism comprising a second connector element, and an actuator arrangement comprising an actuator connector element, wherein the second connector element at least partially enclosing the actuator connector element, and the actuator connector element at least partially enclosing the first connector element, the method comprising the steps of connecting the actuator connector element to the first connector element and moving the actuator connector element in an axial direction for engagement of a first gear of said transmission arrangement; or connecting the actuator connector element to the second connector element and moving the actuator connector element in an axial direction for engagement of a second gear of said transmission arrangement.

According to an example embodiment, the gear shift arrangement further comprises an additional actuator arrangement comprising a first and a second additional connector element, the method comprising the steps of moving the first additional connector element through a first through hole of the actuator connector element and into a hole of the first connector element when connecting the actuator connector element to the first connector element; and moving the second additional connector element through a second through hole of the actuator connector element and into a through hole of the second connector element when connecting the actuator connector element to the second connector element.

Effects and features of the third aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
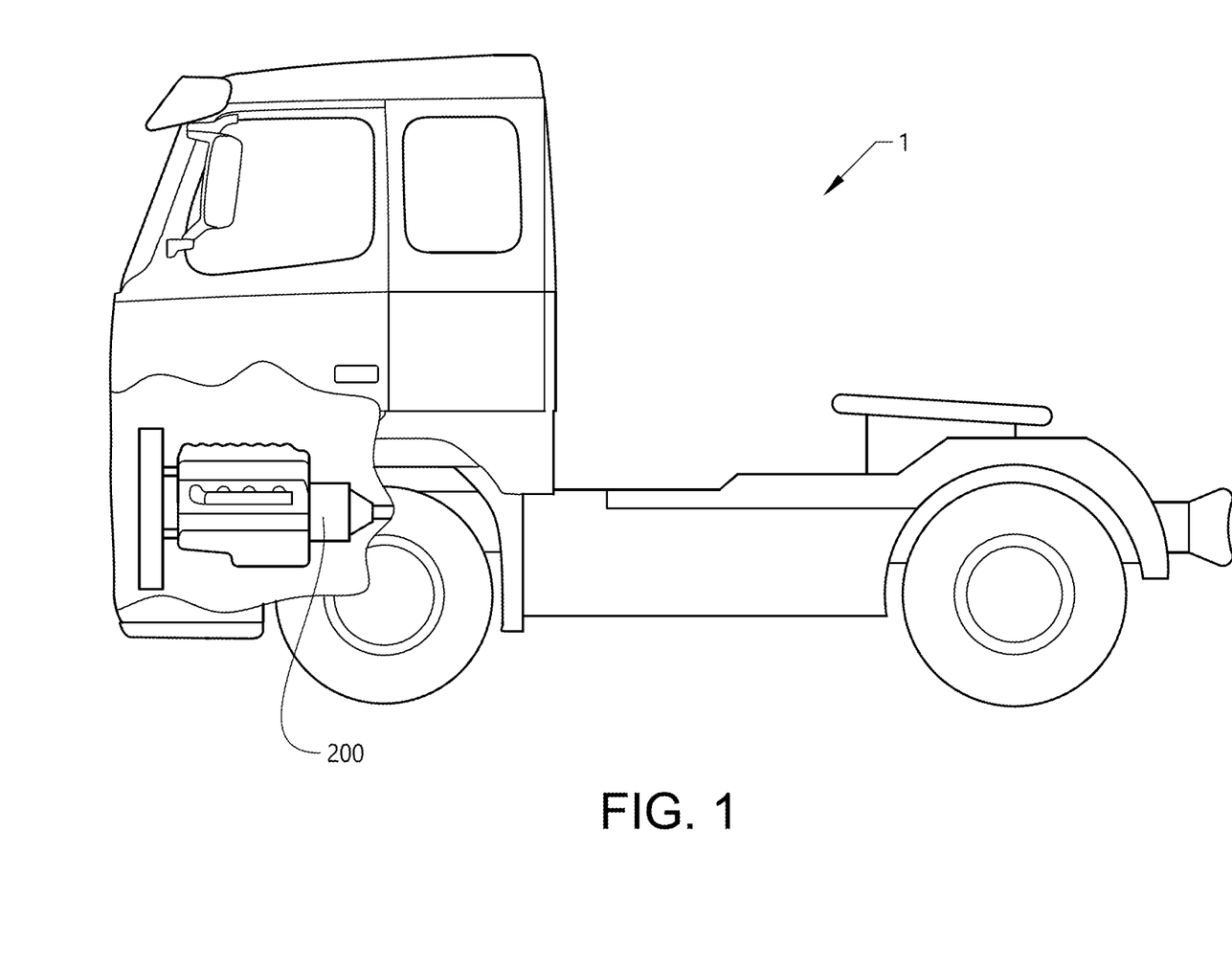
FIG. 1 is a lateral side view illustrating an example embodiment of a vehicle in the form of a truck.

With particular reference to FIG. 1, there is provided a vehicle 1 with a transmission arrangement 200 comprising a gear shift arrangement 100 (FIG. 2) according to the present invention. The vehicle 1 depicted in FIG. 1 is a truck for which the inventive transmission arrangement 200 and gear shift arrangement 100, as will be described further below, is particularly suitable for.

Figure 2:
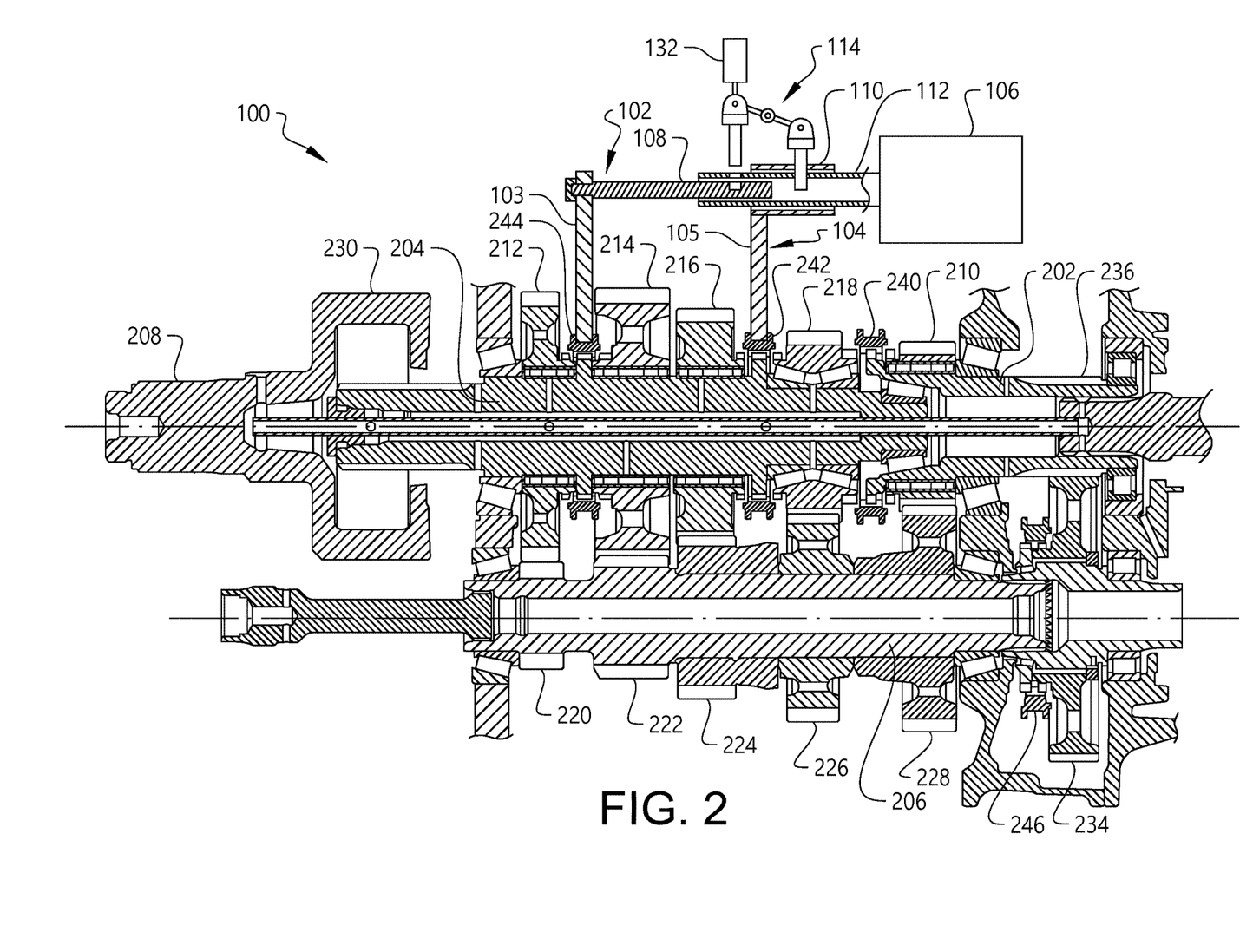
FIG. 2 is a cross-sectional side view of a transmission arrangement according to an example embodiment.

Turning to FIG. 2, which is a cross-sectional side view of a transmission arrangement 200 according to an example embodiment. In detail, FIG. 2 depicts a transmission arrangement 200 comprising an input shaft 202, a main shaft 204, a counter shaft 206 and an output shaft 208. The input shaft 202 comprises a first input shaft gear wheel 210 at an outer end of the input shaft 202. The first input shaft gear wheel 210 is preferably journaled with a bearing against the input shaft 202. The main shaft 204 comprises a first 212, a second 214, a third 216 and a fourth 218 main shaft gear wheel, wherein a respective bearing arrangement is provided between each of the main shaft gear wheels and the main shaft 204. Furthermore, the counter shaft 206 comprises a first 220, a second 222, a third 224, a fourth 226 and a fifth 228 counter shaft gear wheel. Each of the first 200, second 222, third 224, fourth 226 and fifth 228 counter shaft gear wheels are either arranged as an integral part of the counter shaft 206 or are press-fitted to the counter shaft 206. Furthermore, an additional transmission arrangement 230 is arranged between the main shaft 204 and the output shaft 208. The additional transmission arrangement 230 is preferably a planetary transmission arrangement also referred to as a range gear.

Moreover, the input shaft 202 also comprises a second input shaft gear wheel 236 which is integrated in the input shaft 202. Also, the counter shaft 206 comprises a sixth counter shaft gear wheel 234 which is journaled with a bearing against the counter shaft 206.

Furthermore, the first input shaft gear wheel 210 is arranged in meshed connection with the fifth counter shaft gear wheel 228, the second input shaft gear wheel 236 is arranged in meshed connection with the sixth counter shaft gear wheel 234.

The first main shaft gear wheel 212 is connected to the first counter shaft gear wheel 220 via a reverse gear wheel (not shown). Hereby, reverse gears of the transmission arrangement 200 are obtainable.

The second main shaft gear wheel 214 is arranged in meshed connection with the second counter shaft gear wheel 222, the third main shaft gear wheel 216 is arranged in meshed connection with the third counter shaft gear wheel 224, and the fourth main shaft gear wheel 218 is arranged in meshed connection with the fourth counter shaft gear wheel 226.

With the transmission arrangement 200 depicted in FIG. 2, an input torque is received from a prime mover (not shown) to the input shaft 202. The torque is further directed to the output shaft 208. By means of the main shaft 204, the counter shaft 206, and the plurality of gear wheels, a number of transmission ratios can be obtained between the input shaft 202 and the output shaft 208. The above have described the connection between the gear wheels. However, since some of the gear wheels are journaled with a bearing arrangement to its respective shaft, a connecting arrangement is needed for selectively connecting the journaled gear wheels to the respective shaft. Such connecting arrangement comprises an axially movable engaging sleeve selectively connecting to gear teeth of the journaled gear wheel.

The engaging sleeve also connects to gear teeth on the respective shaft, thus connecting the journaled gear wheel to the shaft.

By means of the transmission arrangement 200 depicted in FIG. 2, four engaging sleeves are provided. In more detail, the transmission arrangement 200 comprises an input shaft engaging sleeve 240 arranged to selectively connect the input shaft 202 to the first input shaft gear wheel 210 and the fourth main shaft gear wheel 218. The transmission arrangement further comprises a first main shaft engaging sleeve 242 selectively connecting the main shaft 204 to the third 216 and fourth 218 main shaft gear wheels, and a second main shaft engaging sleeve 244 selectively connecting the main shaft 204 to the first 212 and second 214 main shaft gear wheels. Finally, the transmission arrangement 200 comprises counter shaft engaging sleeve 246 arranged to selectively connect the sixth counter shaft gear wheel 234 to the counter shaft 206.

Furthermore, the engaging sleeves are slidably connected to a gear shift arrangement 100 comprising a connecting mechanism, preferably provided with a shift fork. An example embodiment of a gear shift arrangement 100 will be described in further detail below in relation to the description of FIGS. 3a-3b.

The following will describe the torque flow of the transmission arrangement for some of the gears obtainable by the transmission arrangement 200.

Firstly, the torque from the input shaft 202 can be provided to the counter shaft 206 by connecting the input shaft 202 to the first input shaft gear wheel 210 by connecting the input shaft connecting sleeve 240 to the first input shaft gear wheel 210 and the gears of the input shaft 202. The first input shaft gear wheel 210 is in turned arranged in meshed connection with the fifth counter shaft gear wheel 228 which is connected to the counter shaft 206. The torque can thereafter be directed to the main shaft 204 by means connecting the first main shaft engaging sleeve 242 to the third 216 or fourth 218 main shaft gear wheels, or to connect the second main shaft engaging sleeve 244 to the second main shaft gear wheel 214. The torque can also be transmitted to the main shaft 204 by means of connecting the second main shaft engaging sleeve 244 to the first main shaft gear wheel 212, wherein reverse gears are obtained. The torque is thereafter transmitted from the main shaft 204 to the output shaft 208 via the additional transmission arrangement 230, wherein further gear ratios are obtainable.

Moreover, torque can also be transmitted from the input shaft 202 to the counter shaft 206 by connecting the counter shaft 206 to the sixth counter shaft gear wheel 234 by connecting the counter shaft engaging sleeve 246 to the sixth counter shaft gear wheel 234 and the gears of the counter shaft 206.

Still further, a so-called direct gear can also be obtained by connecting the input shaft connecting sleeve 240 to the fourth main shaft gear wheel 218, i.e. connecting the input shaft 202 to the fourth main shaft gear wheel 218. The fourth main shaft gear wheel 218 is in turn connected to the main shaft 204 by means of connecting the first main shaft engaging sleeve 242 to the fourth main shaft gear wheel 218. Hereby, the input shaft 202 is connected to the main shaft 206 without passing through the counter shaft.

As described above, the transmission arrangement 200 comprises a gear shift arrangement 100 for controlling the movement of the engaging sleeves. The gear shift arrangement 100 of the present disclosure is arranged to control the first 242 and second 244 main shaft engaging sleeves. It should however be readily understood that the gear shift arrangement 100 may be used for controlling other combination of engaging sleeves as well, such as the input shaft engaging sleeve 240 and the counter shaft engaging sleeve 246.

As stated, the gear shift arrangement 100 depicted in FIG. 2, is arranged to axially move the first 242 and second 244 main shaft engaging sleeves. The first main shaft gear wheel 212 is arranged to obtain a reverse gear, the second main shaft gear wheel 214 is arranged to obtain a first gear, the third main shaft gear wheel 216 is arranged to obtain a second gear, and the fourth main shaft gear wheel 218 is arranged to obtain a third gear. Hence, the gear shift arrangement 100 in FIG. 2 is arranged to shift between the reverse gear and the first gear, as well as between the second and third gears.

Figure 3A:
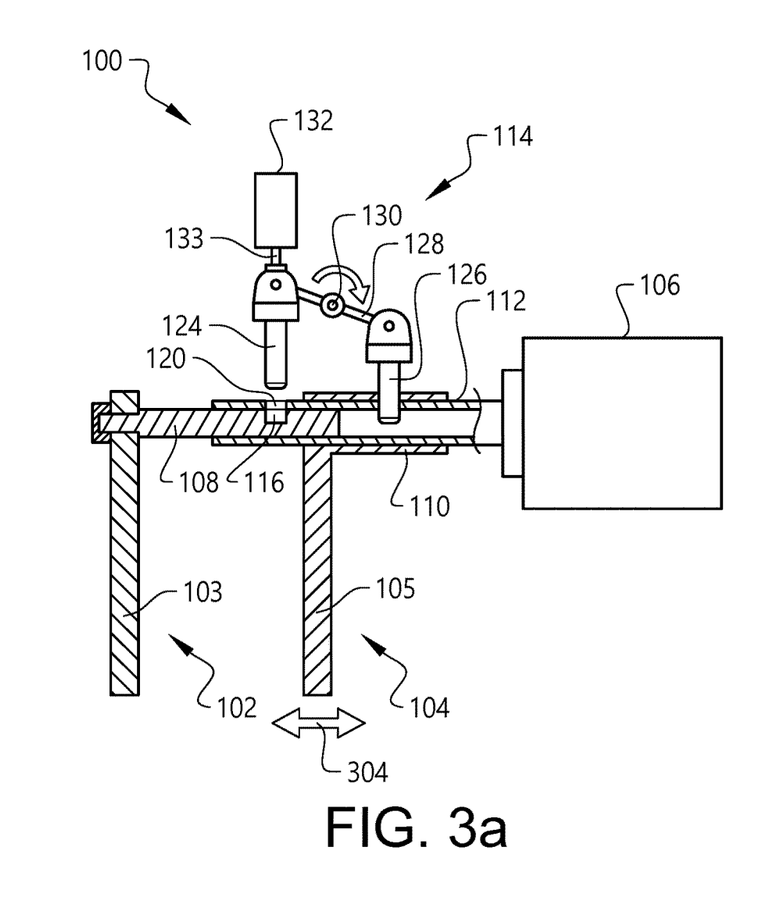
FIGS. 3a-3b schematically illustrate a gear shift arrangement according to an example embodiment.
Figure 3B:
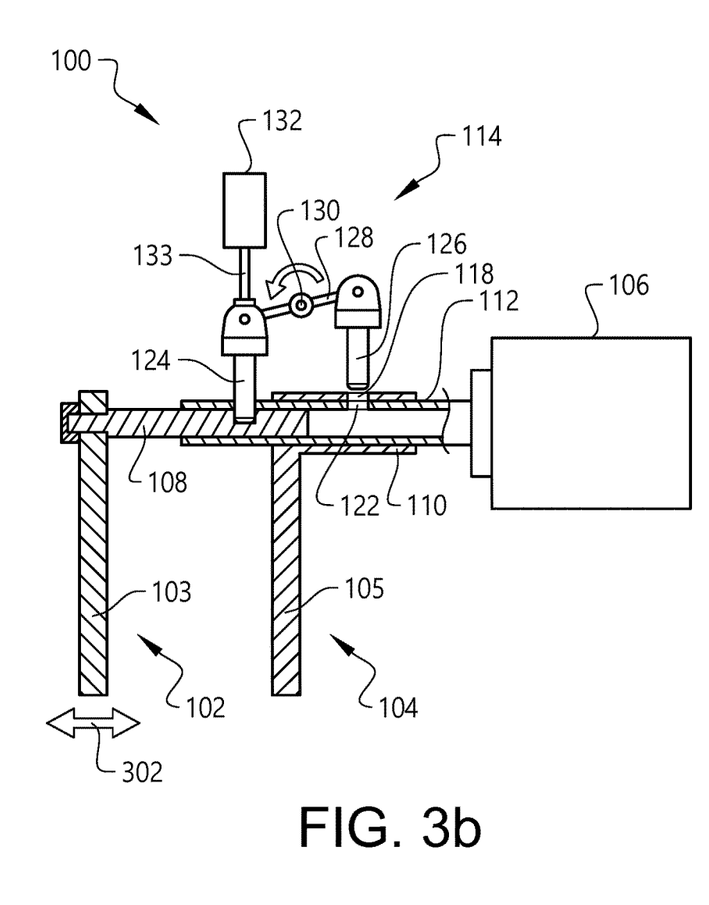

In order to describe the present invention in further detail, reference is now made to FIGS. 3a and 3b which schematically illustrate the gear shift arrangement 100 depicted in FIG. 2.

As can be seen in FIGS. 3a-3b, the gear shift arrangement 100 comprises an actuator arrangement 106 comprising an axially movable actuator connector element 112. The gear shift arrangement 100 further comprises a first connecting mechanism 102 and a second connecting mechanism 104, which first 102 and second 104 connecting mechanisms comprises a respective first 108 and second 110 connector element. The first 102 and second 104 connecting mechanisms are also axially movable and comprising a first 103 and a second 105 shift fork, respectively. Hereby, the first shift fork 103 is connected to the second main shaft engaging sleeve 244 while the second shift fork 105 is connected to the first main shaft engaging sleeve 242. In further detail, the shift forks 103, 105 are slidably connected to the respective engaging sleeves which mean that the shift forks can be maintained stationary while the engaging sleeves rotate with the gear wheel and shaft they are connected to.

Moreover, as also depicted in FIG. 2, the actuator connector element 112 and the second connector element 110 have an extension in the axial direction of the transmission arrangement 200 and are arranged as hollow tubes, while the first connector element 108 has an extension in the axial direction and is arranged as a solid shaft. The first connector element 108 may of course also be arranged as a hollow tube. The first connector element 108 thus extends axially in a direction from the first shift fork 103 towards the actuator arrangement 106. Similarly, the second connector element 110 extends axially in a direction from the second shift fork 105 towards the actuator arrangement 106.

Furthermore, the actuator connector element 112 comprises first 120 and second 122 through holes which extend from the outer surface of the actuator connector element 112 and into the hollow tube. Also, the second connecting connector element 110 comprises a through hole 118, while the first connector element 108 comprises as hole 116, which may be a through hole or a cavity, etc. Hereby, the actuator connector element 112 is connectable to the first 108 and second 110 connector elements, which will be described further below.

Furthermore, the gear shift arrangement 100 comprises an additional actuator arrangement 114. The additional actuator arrangement 114 comprises a first 124 and a second 126 additional connector element, and an actuator 132 for controlling the motion of the first 124 and second 126 additional connector elements. The additional actuator arrangement 114 depicted in FIGS. 3a and 3b further comprises a pivotable lever arm 128 and a pivotal joint 130. Hereby, the actuator 132 of the additional actuator arrangement 114 is arranged to raise and lower the first 124 and second 126 additional connector elements by means of extending/retracting a bar 133 from the actuator 132. The actuator 132 of the additional actuator arrangement 114 is in FIGS. 3a-3b connected to the first additional connector element 124. Hereby, when extending the bar 133 from the actuator 132 of the additional actuator arrangement 114, the first additional connector element 124 is moved towards the actuator connector element 112 in a direction substantially perpendicular to the extension of the actuator connector element 112, while at the same time the second additional connector element 126 is moved in a direction away from the actuator connector element 112. It should be readily understood that the actuator 132 of the additional actuator arrangement 114 may be arranged in a number of ways in comparison to the embodiment depicted in FIGS. 3a-3b. For example, the actuator 132 of the additional actuator arrangement 114 and the bar 133 may be connected to the second additional connector elements 126. As an additional alternative, the actuator 132 of the additional actuator arrangement 114 may be connected to the pivotal joint 130 and arranged to provide a rotary motion for moving the first 124 and second 126 additional connector elements. A further detailed example embodiment of the additional actuator arrangement 114 is given below in relation to the description of FIG. 4.

The second additional connector element 126 is arranged to be provided through the second through hole 122 of the actuator connector element 112 and through the through hole 118 of the second connector element 110 for connecting the actuator connector element 112 to the second connector element 110, as depicted in FIG. 3*a*. The first additional connector element 124 is arranged to be provided through the first through hole 120 of the actuator connector element 112 and into the hole 116 of the first connector element 108 for connecting the actuator connector element 112 to the first connector element 108, as depicted in FIG. 3*b*.

The following will now describe the functionality of the gear shift arrangement 100 according to the example embodiment depicted in FIGS. 2 and 3*a*-3*b*. Synchronization of gears etc. is considered to be well known for the skilled person and is therefore not described when describing the functionality of the gear shift arrangement 100.

As described above, the first connecting mechanism 102 is connected to the second main shaft engaging sleeve 244 by means of the first shift fork 103, while the second connecting mechanism 104 is connected to the first main shaft engaging sleeve 242 by means of the second shift fork 105.

When there is a desire to engage the reverse gear, i.e. connect the first main shaft gear wheel 212 to the main shaft 204, the first connector element 108 and the actuator connector element 112 are arranged such that the hole 116 of the first actuator element 108 and the first through hole 120 of the actuator connector element 112 are substantially aligned with each other. The additional actuator arrangement 114 can thus control the motion of the first additional connector element 124 for positioning the first additional connector element 124 through the first through hole 120 and into the hole 116 of the first connector element 108, as depicted in FIG. 3*b*. Hereby, the actuator connector element 112 is connected to the first connector element 108. The actuator arrangement 106 can now control the first shift fork 103 to move the second main shaft engaging sleeve 244 for connection to the first main shaft gear wheel 212, thus achieving reverse gears for the transmission arrangement 200. The movement of the first connector element 108 is depicted in FIG. 3*b* by a horizontal two-way arrow 302.

When shifting to the first gear, the first connector element 108 is connected to the actuator connector element 112 as described above but the actuator arrangement 106 controls the first shift fork 103 to be moved in the opposite axial direction in comparison to engagement of the reverse gear. Hereby, the actuator arrangement 106 controls the first shift fork 103 to move the second main shaft engaging sleeve 244 for connection to the second main shaft gear wheel 214.

When connecting the first connector element 108 to the actuator connector element 112, the first connector element 108 and the actuator connector element 112 are axially movable relative to the second connector element 110 which is kept substantially stationary.

When, on the other hand, there is a desire to shift to the second or third gear, i.e. connect the third 216 or fourth 218 main shaft gear wheels to the main shaft 204, the second connector element 110 and the actuator connector element 112 are arranged such that the through hole 118 of the second connector element 110 and the second through hole 122 of the actuator connector element 112 are substantially aligned with each other. The additional actuator arrangement 114 can hereby control the motion of the second additional connector element 126 for positioning the second additional connector element 126 through the through hole 118 of the second connector element 110 and through the second through hole 122 of the actuator connector element, as depicted in FIG. 3*a*. Hereby, the actuator connector element 112 is connected to the second connector element 110. The actuator arrangement 106 can now control the second shift fork 105 to move the first main shaft engaging sleeve 242 for connection to the third 216 or fourth 218 main shaft gear wheels 212, thus obtaining the second or third gear. The actuator thus controls the second shift fork 105 to be moved in a first axial direction when connecting the first main shaft engaging sleeve 242 to the third main shaft gear wheel 216, and to be moved in a second axial direction, opposite the first axial direction, when connecting the first main shaft engaging sleeve 242 to the fourth main shaft gear wheel 218. The movement of the second connector element 110 is depicted in FIG. 3*a* by a horizontal two-way arrow 304.

When connecting the second connector element 110 to the actuator connector element 112, the second connector element 110 and the actuator connector element 112 are axially movable relative the first connector element 108 which is kept substantially stationary.

Figure 4:
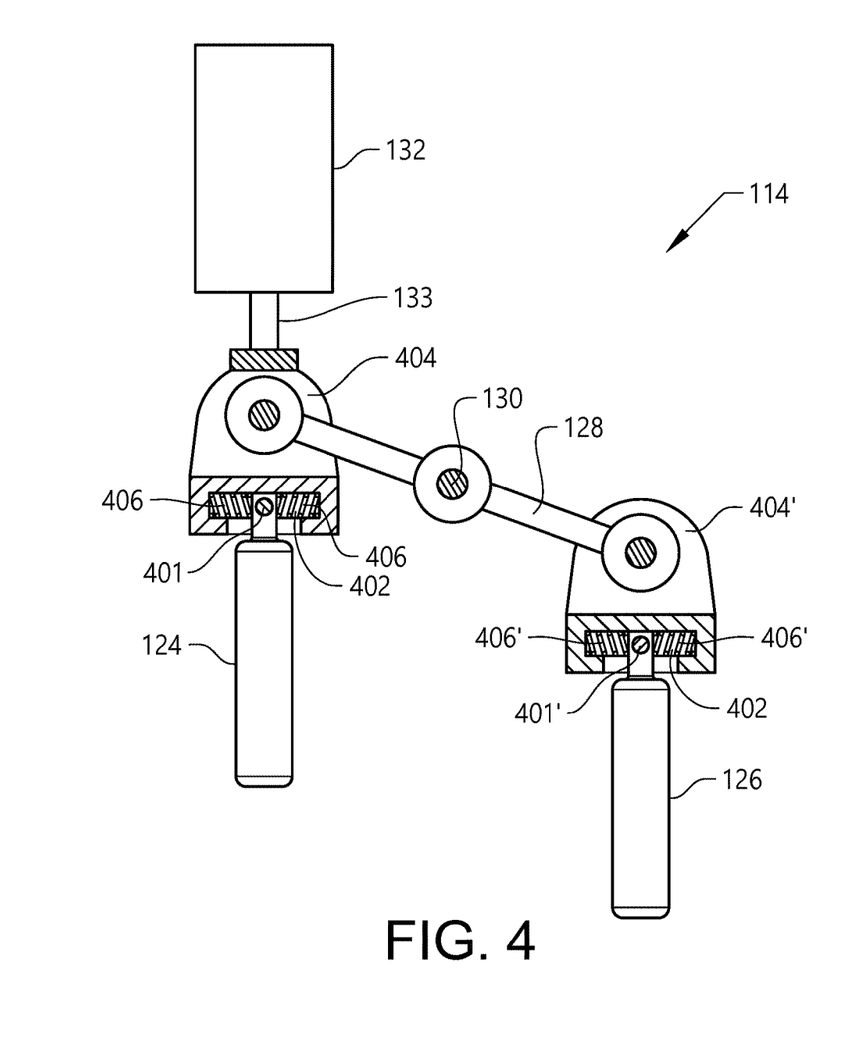
FIG. 4 is a schematic illustration of an example embodiment of an additional actuator arrangement for use in the gear shift arrangement in FIGS. 3a-3b.

In order to describe an example embodiment of the additional actuator arrangement 114 in further detail, reference is now made to FIG. 4. As can be seen, an upper portion 401 of the first additional connector element 124 is arranged in a groove 402 of a portion 404 connected to the pivotable lever arm 128. Hereby, the first additional connector element 124 is movable in the axial direction of the transmission arrangement 200 when connecting the first connector element 108 to the actuator connector element 112. Moreover, the upper portion 401 of the first additional connector element 124 is spring loaded in the groove 402, which is schematically illustrated by means of helical springs 406 on a respective side of the upper portion 401. By spring loading the upper portion 401, the first additional connector element 124 is returned to an initial starting position once being disconnected from the first through hole 120 of the actuator connector element 112 and the hole 116 of the first connector element 108.

It should be readily understood that the helical springs are merely for illustrative purposes and other springing means achieving the result of returning the first additional connector element 124 to its initial starting position are of course also conceivable.

An upper portion 401' of the second additional connector element 126 is, as depicted in FIG. 4, also arranged in a groove 402' of a second horizontal portion 404' connected to the pivotable lever arm 128. Also the upper portion 401' of the second additional connector element 126 is spring loaded in a similar manner as described for the first additional connector element 124, illustrated by means of helical springs 406'.

Figure 5:
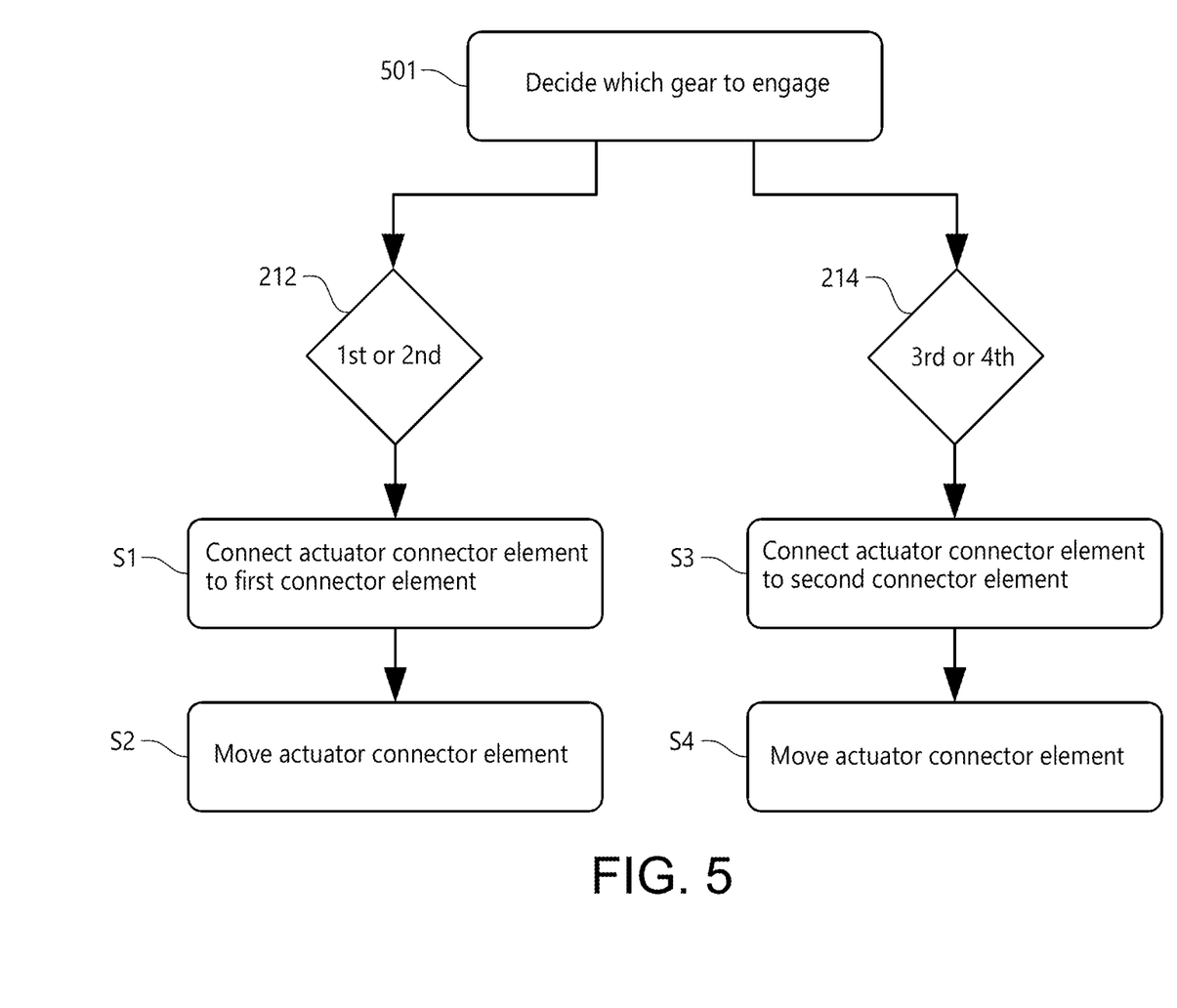
FIG. 5 is flow chart of a method for controlling gear shift in the transmission arrangement of FIG. 2 according to an example embodiment.

In order to sum up, reference is made to FIG. 5 which is a flow chart of a method for controlling gear shift in the transmission arrangement 100 described above according to an example embodiment.

Firstly, it is decided which of the gears that should be engaged 501. If it is decided that one of the reverse gear or the first gear should be engaged, i.e. one of the first 212 and second 214 main shaft gear wheels should be connected to the main shaft 204. The actuator connector element 112 is then connected S1 to the first connector element 108 according to the above description. The actuator arrangement 106 thereafter moves S2 the actuator connector element 112 such that the first shift fork 103 moves the second main shaft engaging sleeve 244 to either the first main shaft gear wheel 212 or the second main shaft gear wheel 214.

On the other hand, if it is decided that one of the second or third gear should be engaged, i.e. one of the third 216 and fourth 218 main shaft gear wheels should be connected to the main shaft 204, then the actuator connector element 112 is connected S3 to the second connector element 110 according to the above description. The actuator arrangement 106 thereafter moves S4 the actuator connector element 112 such that the second shift fork 105 moves the first main shaft engaging sleeve 242 to either the third main shaft gear wheel 216 or the fourth main shaft gear wheel 218.

It is to be understood that the present invention is not limited to the embodiments described above and illustrated in the drawings; rather, the skilled person will recognize that many changes and modifications may be made within the scope of the appended claims.

The invention claimed is:

1. A gear shift arrangement for a transmission arrangement of a vehicle, the gear shift arrangement comprising an axially movable first connecting mechanism connectable to a first gear wheel for engagement of a first gear of the transmission arrangement; an axially movable second connecting mechanism connectable to a second gear wheel for engagement of a second gear of the transmission arrangement; an actuator arrangement configured to controllably connect the first connecting mechanism and the first gear wheel to each other, and to controllably connect the second connecting mechanism and the second gear wheel to each other, characterized in that the first connecting mechanism comprises a first connector element, the second connecting mechanism comprises a second connector element and the actuator arrangement comprises an actuator connector element, wherein the second connector element at least partially enclosing the actuator connector element, and the actuator connector element at least partially enclosing the first connector element, wherein the gear shift arrangement further comprises means for selectively connecting the actuator connector element to the first and second connector elements.

2. The gear shift arrangement according to claim 1, wherein the second connector element and the actuator connector element are tube shaped and have an extension in an axial direction of the transmission arrangement.

3. The gear shift arrangement according to claim 2, wherein the actuator connector element is axially movable within the tube of the second connector element.

4. The gear shift arrangement according to claim 2, wherein the first connector element is axially movable within the tube of the actuator connector element.

5. The gear shift arrangement according to claim 1, wherein the first connector element comprises a hole, the second connector element comprises a through hole, and the actuator connector element comprises a first and a second through hole, wherein the actuator connector element is axially movable between a first position where the first through hole of the actuator connector element is substantially aligned with the hole of the first connector element, and a second position where the second through hole of the actuator connector element is substantially aligned with the through hole of the second connector element.

6. The gear shift arrangement according to claim 1, wherein the means for selectively connecting the actuator connector element to the first and second connector elements comprises a first and a second additional connector element, said first additional connector element being arranged to connect the actuator connector element to the first connector element, and said second additional connector element being arranged to connect the actuator connector element to the second connector element.

7. The gear shift arrangement according to claim 6, wherein the first and second additional connector elements are movable in a direction substantially perpendicular to the axial direction of the transmission arrangement.

8. The gear shift arrangement according to claim 6, wherein the first and second additional connector elements are movable in a direction substantially parallel to the axial direction of the transmission arrangement.

9. The gear shift arrangement according to claim 6, wherein the means for selectively connecting the actuator connector element to the first and second connector elements comprises a pivotable lever arm, wherein the first and second additional connector elements are positioned on a respective side of a pivotal joint of said pivotable lever arm.

10. The gear shift arrangement according to claim 6, wherein the means for selectively connecting the actuator connector element to the first and second connector elements comprises an actuator for moving the first and second additional connector elements in the direction substantially perpendicular to the axial direction of the transmission arrangement.

11. The gear shift arrangement according to claim 10, wherein the actuator is one of a pneumatically, a hydraulically or an electrically controlled actuator.

12. A transmission arrangement for a vehicle, the transmission arrangement comprising a first gear wheel engaged for obtaining a first gear, and a second gear wheel engaged for obtaining a second gear, wherein the transmission arrangement further comprises a gear shift arrangement according to claim 1 for engaging the first and second gears.

\* \* \* \* \*